(12) United States Patent
Ferreira et al.

(10) Patent No.: US 9,451,128 B2
(45) Date of Patent: Sep. 20, 2016

(54) MOBILE DATA PROCESSING HAVING SECURED ASSOCIATION WITH MULTIFUNCTION DEVICE

(71) Applicants: Canon Information and Imaging Solutions, Inc., Melville, NY (US); Canon U.S.A., Inc., Melville, NY (US)

(72) Inventors: Manuel Pearson Ferreira, Long Beach, CA (US); Craig Mazzagatte, Aliso Viejo, CA (US); Royce E. Slick, Mission Viejo, CA (US); Anthony Louis DeMartini, St. James, NY (US); Nigel Patrick Brady, New York, NY (US); Jiuyuan Ge, Centereach, NY (US); Jiayin Peng, New York, NY (US)

(73) Assignees: CANON INFORMATION AND IMAGING SOLUTIONS, INC., Melville, NY (US); CANON USA, INC., Melville, NY (US)

( * ) Notice: Subject to any disclaimer, the term of this patent is extended or adjusted under 35 U.S.C. 154(b) by 0 days.

(21) Appl. No.: 14/250,277

(22) Filed: Apr. 10, 2014

(65) Prior Publication Data

US 2015/0296099 A1    Oct. 15, 2015

Related U.S. Application Data

(60) Provisional application No. 61/811,647, filed on Apr. 12, 2013.

(51) Int. Cl.
*G06F 3/12* (2006.01)
*H04N 1/44* (2006.01)
*H04N 1/00* (2006.01)

(52) U.S. Cl.
CPC ........ *H04N 1/4413* (2013.01); *H04N 1/00204* (2013.01); *H04N 1/4433* (2013.01); *H04N 2201/0075* (2013.01); *H04N 2201/0094* (2013.01)

(58) Field of Classification Search
CPC ............. H04N 1/4413; H04N 1/4433; H04N 1/00204
USPC ....................................................... 358/1.15
See application file for complete search history.

(56) References Cited

U.S. PATENT DOCUMENTS 7,113,300 B2    9/2006    Strobel et al.
7,284,277 B2    10/2007   Lewis
(Continued)

OTHER PUBLICATIONS

Ricoh, HotSpot Enterprise, User's Quick Reference.
(Continued)

*Primary Examiner* — Benjamin O Dulaney
(74) *Attorney, Agent, or Firm* — Canon USA, Inc. IP Division

(57) ABSTRACT

A mobile data processing method, in which a request for performing a data processing job by a data processing device is initiated from a user of a mobile device. A device code of the mobile device in association with the user is transmitted to the data processing device. The user is authenticated by the data processing device. Whether the device code of the mobile device is identifiable by the data processing device is determined. An entry of the data processing job in association with the user and the device code of the mobile device is created in the data processing device if the device code of the mobile device is identified by the data processing device. The data processing job is executed if the entry of the data processing job is created and stored in association with the user and the device in the data processing device.

19 Claims, 7 Drawing Sheets

(56) References Cited

U.S. PATENT DOCUMENTS

| | | | |
|---|---|---|---|
| 7,561,294 B2 | 7/2009 | Ciriza et al. | |
| 7,576,883 B2 | 8/2009 | Ragnet et al. | |
| 2002/0122201 A1 | 9/2002 | Haraguchi et al. | |
| 2007/0019215 A1* | 1/2007 | Yu | H04N 1/00307 358/1.3 |
| 2007/0019232 A1* | 1/2007 | Kano | H04N 1/00307 358/1.15 |
| 2007/0133843 A1* | 6/2007 | Nakatani | G06Q 20/3276 382/115 |
| 2011/0085196 A1* | 4/2011 | Liu | G06F 3/1204 358/1.15 |
| 2012/0079081 A1* | 3/2012 | Parks | G06F 3/1204 709/220 |
| 2012/0287460 A1* | 11/2012 | McMillin | H04N 1/00204 358/1.15 |
| 2013/0003120 A1* | 1/2013 | Watariuchi | G06F 3/1204 358/1.15 |
| 2013/0016392 A1* | 1/2013 | Lee | G06F 3/1204 358/1.15 |
| 2013/0141747 A1* | 6/2013 | Oba | G06F 3/1292 358/1.14 |
| 2013/0194623 A1* | 8/2013 | Tecu | G06F 3/1204 358/1.15 |
| 2013/0250358 A1* | 9/2013 | Suzuki | H04L 67/14 358/1.15 |
| 2014/0016161 A1* | 1/2014 | Yamada | G06F 3/1293 358/1.15 |
| 2014/0046842 A1* | 2/2014 | Irudayam | G07F 19/202 705/43 |
| 2014/0114782 A1* | 4/2014 | Cloin | G07F 17/42 705/24 |

OTHER PUBLICATIONS

Ricoh, HotSpot Enterprise brouchur.
Ricoh, HotSpot Enterprise, Security Whitepaper.
Ricoh, HotSpot—Mobile Printing, http:\\www.ricoh-usa/services_and_solutions/hotspot/hotspot.aspx.
Ricoh, What is HotSpot?—Mobile Printing, http:\\www.ricoh-usa/services_and_solutions/hotspot/enterprise.aspx.
Ricoh, HotSpot Enterprise http://www.ricoh-usa.com/services_and_solutions/hotspot/enterprise.aspx.
Lexmark, Mobile Solutions for Banking, http://www.lexmark.com/en_US/solutions/industry-solutions/financial-services/banking/mobile-solutions.shtml.
IBM, Cloud Print for IBM Cloud Platforms v.1.0, http://www-304.ibm.com/partnerworld/gsd/solutiondetails.do?solution=49728&expand=true&lc=en.
Cortado, ThinPrint, http://thinprint.com.
HP, Mobile Print Security, http://www.hp.com/large/ipg/gateway/secure-mobile-print.html.
HP, Access Control Secure Authentication, http://www8.hp.com/us/en/solutions/access-control-printing-solutions/secure-authentication.html.
HP, Setting a Strategy for Secure Mobile Printing http://www.hp.com/large/ipg/gateway/pdfs/strategy_secure_mobile_printing.pdf.
HP, SecureJet brochure http://h20424.www2.hp.com/program/wdyhts/enterpriseprint/sg/en/pdfs/solutions/HP_SecureJet_Brochure.pdf.

\* cited by examiner

MOBILE DATA PROCESSING HAVING SECURED ASSOCIATION WITH MULTIFUNCTION DEVICE

CROSS REFERENCE

This application claims the benefit of the U.S. provisional application No. 61/811,647 entitled "Secure Mode Operation in a Mode Printing Environment" filed on Apr. 12, 2013, which is incorporated by reference herein in its entirety.

BACKGROUND

1. Field of the Disclosure

The present disclosure relates in general to mobile data processing, and more particularly, to security features of mobile data processing.

2. Description of the Related Art

The advancement of mobile devices has made activities that used to require staying in one place portable. People can use mobile devices to create, transmit, and receive data and images on-the-go. Many smartphones and portable tablets include a built-in camera to capture images, memory to store the captured images in the built-in memory, and a display to reproduce the image. The captured image can be transmitted to a remote device for further processing or reproduction. The mobile device can also receive and reproduce images or data from a remote device. In the application of exchanging data, images, documents, or information with a multifunction device (MFD) or a multifunction peripheral (MFP), mobile devices generally have no secured association with the domain in which the multifunction device is located. The lack of secured association between the mobile device and the MFD makes it difficult to control access to the MFD in an environment where security and tracking of device resource usage are required.

SUMMARY

According to an aspect of the disclosure, a mobile image processing method is provided. The mobile image processing method includes requesting an image processing device to perform an image processing job by the user from a mobile device. A device code of the mobile device in association with the user is transmitted to the image processing device. The image processing device authenticates the user before executing the image processing job. The image processing device further identifies the device code of the mobile device. When the device code of the mobile device is identified by the image processing device, a determination is made as to whether the image processing job is stored in association with the user and the device code of the mobile device in the image processing device. If the image processing job has been stored in the image processing device, the image processing job is executed.

The mobile image processing method further includes associating the image processing device with the mobile device. To associate the image processing device with the mobile device, the image processing device generates a device code in response to the authentication of the user thereat. The device code generated by the image processing device is received by the mobile device. In response to reception of the device code generated by the image processing device, the device code of the mobile device in association with the user is generated. The device code of the mobile device is then transmitted to the image processing device, so as to create a new entry of the device code of the mobile device associated with the user in the image processing device.

In one embodiment, an optical code generated by the image processing device includes the device code to be read by the mobile device. The mobile device may include an image capturing device such as a camera or a scanner to scan the optical code.

According to another aspect of the disclosure, a mobile data processing apparatus is provided. The mobile processing apparatus comprises a data processing device and a mobile device. The data processing device includes a first receiving unit, a first information association unit, and a first network interface unit. The first receiving unit is configured to receive user identification information such that the data processing device can authenticate the user of the mobile device. The first information association unit is configured to generate a first device code once the user has been authenticated based on the received user identification information. The first network interface unit is configured to provide the first device code. The mobile device comprises a second receiving unit, a second information association unit, and a second network interface unit. The second receiving unit is configured to receive the first device code from the first network interface. The second information association unit is configured to generate a second device code in association with the user in response to reception of the first device code. The second network interface is configured to transmit both the first and second device codes to the data processing device.

In one embodiment, the first information association is further configured to generate an optically readable code encoded with the first device code, and the data processing device further comprises a display unit configured to display the optically readable code such that the second receiving unit receives the first device code by capturing an image of the optically readable code. The data processing device may further comprise a processing unit for executing a data processing job upon reception of the first and second device codes from the mobile device. In an alternate embodiment, the second information association unit is further configured to generate the second device code and a random third device code in case the second receiving unit does not receive the first device code.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the devices, systems, and methods described herein.

Figure 1:
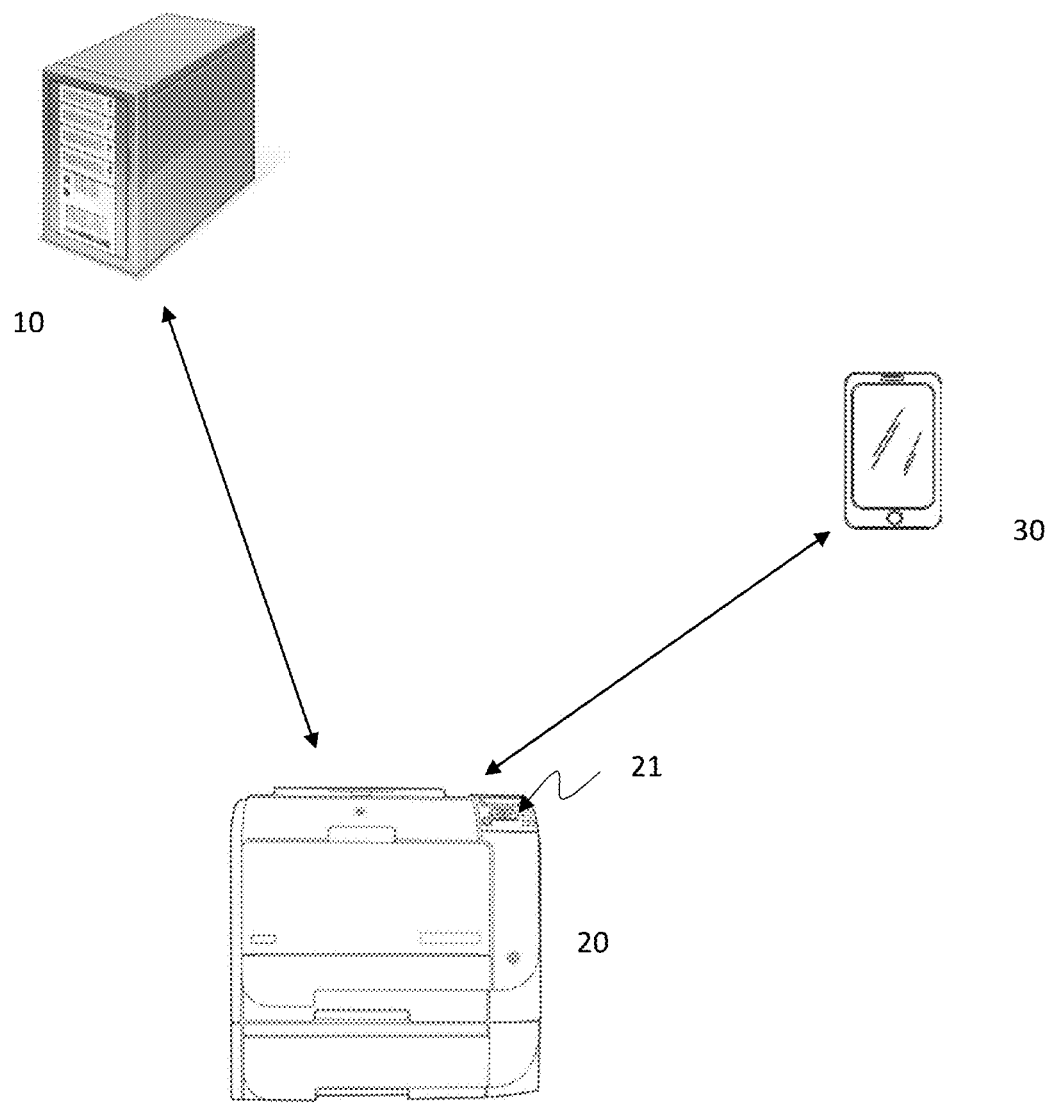
FIG. 1 is a schematic drawing showing an embodiment of a system structure for performing a mobile printing.

FIG. 1 shows an embodiment of a system or a structure in which the mobile data processing job is performed. The mobile data processing job includes a printing job, a scanning job, a facsimile job, and/or a copying job requested from a mobile device, for example. The system includes a server 10, a multifunction device (MFD) or a multifunction peripheral (MFP) 20, and a mobile device 30. The server 10 may include a computer operative to control access and operations of the MFD 20. The MFD 20 includes a data processing device such as a printer, a scanner, a copier, or a facsimile operative to communicate with the server 10 and the mobile device 30. The mobile device 30 includes a cell phone, a portable tablet, a handheld/laptop computer, or other mobile device. In one embodiment, the server 10 provides the Active Directory or other authentication application for controlling access of the MFD 20 by the user. The authentication and request for mobile data processing jobs will be described in detail as follows.

Figure 2:
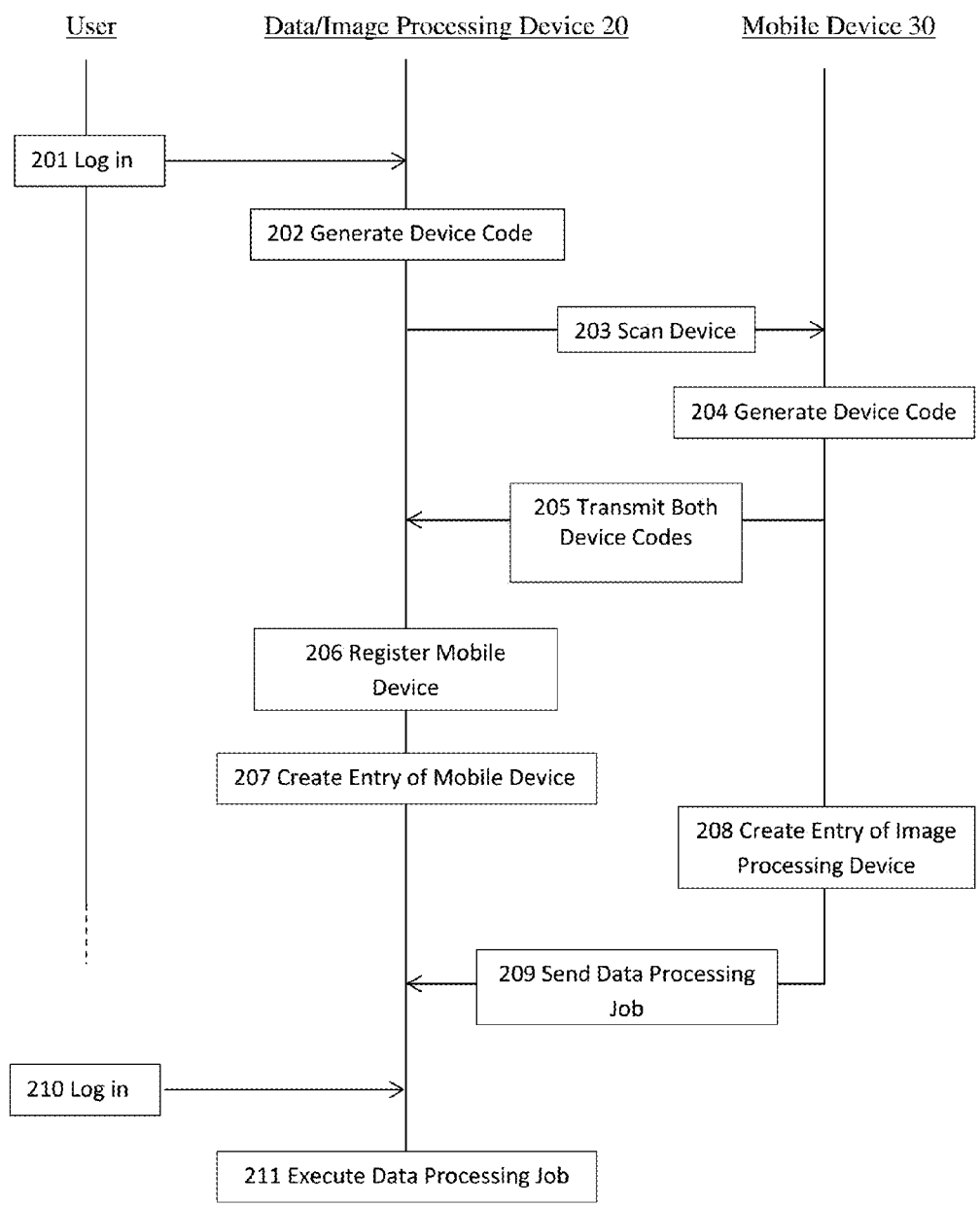
FIG. 2 shows a flow diagram illustrating an exemplary embodiment of a mobile printing method.

FIG. 2 is a flow diagram illustrating an exemplary embodiment of a mobile data/image processing method in association with a data/image processing device and a mobile device. The blocks of this method and other methods described herein may be performed by one or more computing devices, for example, the systems and devices described herein. Also, although this method and other methods are presented in a certain order, some embodiments may perform at least some of the operations in different orders than the presented orders. Examples of possible different orderings include concurrent, overlapping, recorded, simulations, incremental, and interleaved orderings. Thus, other embodiments of this method and the other methods described herein may omit blocks, add blocks, change the order of the blocks, combine blocks, or divide blocks into more blocks.

FIG. 2 shows a user of a data and/or image processing device 20 and a mobile device 30. The data/image processing device 20 includes a multi-function device (MFD) or multi-function peripheral (MFP) with the data and/or image processing functions such as a print function, a scan function, a copy function, and a facsimile function. The data/image processing device 20 may include a display (21 as shown in FIG. 1) configured to display data and/or images. The display may include a user interface allowing the user to input information or commands to the image processing device. For example, the display 21 may include a touch panel and/or soft keyboard such that the user can input information or commands. The display 21 may also be configured to display a screen of multiple function icons allowing user to select a desired function to be performed. The display 21 may also be associated with separate input devices such as a keyboard, a mouse, and/or other voice or optical input devices.

As shown in FIG. 2, the user logs in to the image processing device 20 in block 201. The user may input user identification (UID) information through the user interface of the display 21. In one embodiment, the image processing device 20 may include a card reader configured to read data content, for example, UID information recorded on a medium such as a smart card or a proximity card. The data/image processing device 20 may also include other devices allowing the user to log in through inputs of UID, biometrics or other information. The input user information such as the UID and biometrics information are then verified by the data/image processing device 20 to ensure that the user is authorized to access to the image processing device. In one embodiment, the data/image processing device 20 may transmit the UID information to the server 10 as shown in FIG. 1, and verifies the user based on the authentication result received from the server 10.

Once the user is authenticated through the log-in process in block 201, a device code is generated by the image processing device 20 in block 202. The device code may be displayed on the display 21 of the image processing device 20, such that the mobile device 30 can capture the image of the device code via a built-in camera or a scanner in block 203. In one embodiment, the device code generated by the image processing device 20 can be obtained by the mobile device 30 via email communication. In one alternate embodiment, an external image capturing device may be used to capture the image of the device code; and then transmit the captured image to the mobile device 30. In another alternate embodiment, the device code may be displayed at the image processing device 20 and entered into the mobile device 30 by the user.

In response to the reception of the device code from the image processing device 20, another device code is generated by the mobile device 30 in block 204. The device code from the image processing device 20 and the device code of the mobile device 30 are both transmitted to the image processing device 20 in block 205. The device code of the mobile device 30 does not need to include or carry any information of the device code from the image processing device 20; however, in one embodiment, the device code of the mobile device is encoded with information of the user. Therefore, the image processing device 20 is able to establish an association with the mobile device 30 upon reception of both device codes, so as to register the mobile device 30 in association with the user in block 206. In block 207, an entry of the mobile device 30 in association with the user is created and stored in the image processing device 20. The association between the user, the image processing device 20 and the mobile device 30 is thus established, and an entry of the new device, that is, the image processing device 20, is also added to a list that the mobile device 30 can access in block 208.

Figure 3:
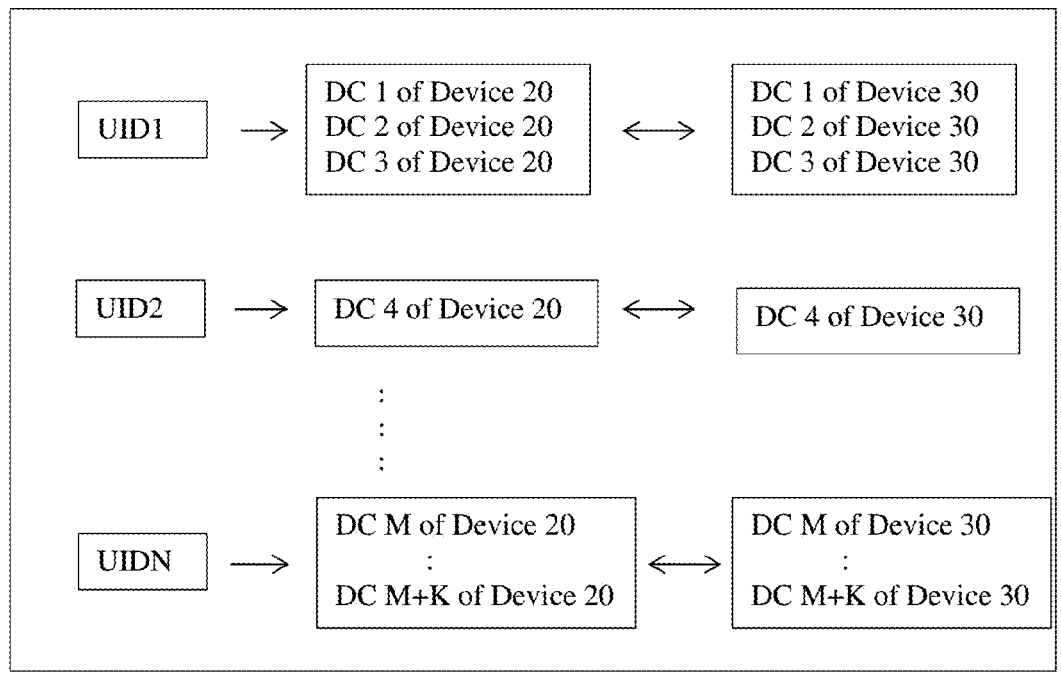
FIG. 3 is an exemplary data structures showing the entries of mobile devices in association with the users.

Blocks 201 to 208 illustrate a flow for establishing an association between the image processing device 20 and the mobile device 30 in a security enabled environment. Once the secured association between the image process device 20 and the mobile device 30 has been established, the user can use the mobile device 30 to submit a job, while the access of the image processing device 10 by the user can be monitored and controlled as needed. It is appreciated that, depending on the system set-up and the given authority of the user, each user may be allowed to register more than one mobile device with the image processing device 20. The mobile devices each user is allowed to use for accessing the image processing are stored in the form of a map in the image processing device as illustrated in FIG. 3. In the example as shown in FIG. 3, users 1 to N identified by UID 1 to UID N may access the image processing device 20. The user UID 1 may access the image processing device with three mobile devices 30 associated with the device codes DC 1, 2, and 3 of both the image processing devices 20 and 30, respectively. The user UID2 is allowed to access the image processing device with one mobile device associated with the device codes DC 4 of both the image processing device and the mobile device 30. The user UID N is allowed to access the image processing device with mobile devices associated with the device codes M to M+K, where N, M, and K or positive integers.

Once the association between the image processing device 20 and the mobile device 30 is established in block 207, the user may send a request to the image processing device 20 to perform a data/image processing job in block 209. For example, the user may send a request from the mobile device 30 to the image processing device 20 to print out a document or image. The user may also send a request from the mobile device 30 to the image processing device 20 for scanning, copying, or sending a facsimile of a document or image. In block 210, the user logs in to the image processing device 20 again, and the data/image processing job is executed in block 211.

Figure 4:
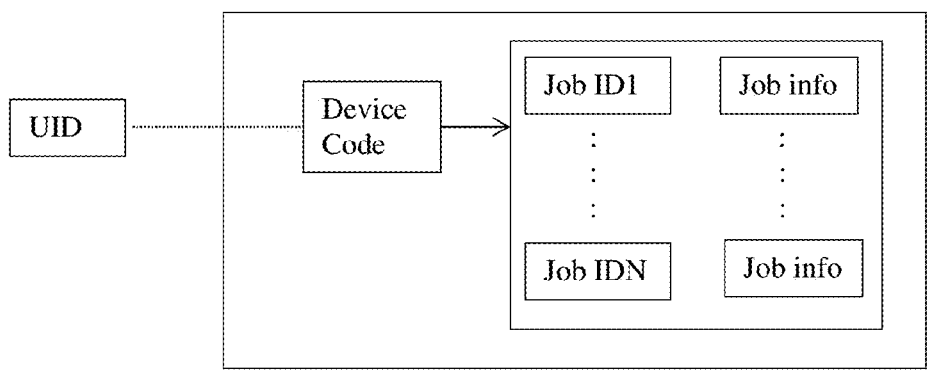
FIG. 4 is an exemplary data structure showing the entries of requested data processing jobs in association with the mobile devices and the users.

In the application of printing a document or image, the mobile device 30 may continuously transmit the data and/or image to be printed to the image processing device 20 once the association between the image processing device 20 and the mobile device 30 has been established. In other words, user may send multiple requests from the mobile device 30 to the image processing device 20 for printing data or images without logging into the image processing device 20 again. Upon receiving the requests, the data or images to be printed may be transmitted from the mobile device 30 or other devices in the network and stored in the image processing device 20. Each print job includes a job ID and information as shown in FIG. 4. The print jobs are associated with a device code that provides the information of the mobile devices from which the print jobs are requested, and the device code is associated with a specific user identified by a specific UID.

Figure 5:
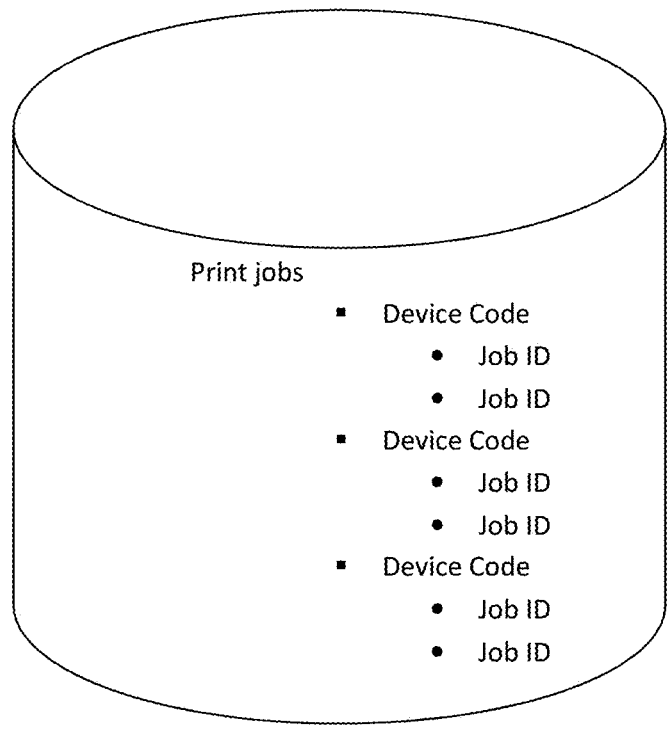
FIG. 5 is an exemplary data structure showing the entries of data processing on-hold in the memory of the image processing device.

As multiple print job requests can be sent without the need of authenticating the user again, the requested print jobs may be stored and on-hold in the memory of the image processing device 20 for execution. FIG. 5 shows an example of a data structure of the on-hold print jobs. As shown, each of the on-hold print jobs has an associated job ID categorized under a device code. Printing of the on-hold jobs will be executed once the user logs in to the image processing device 20 and is authenticated by the image processing device 20 again. In the situation that the memory of the image processing device 20 is full, the request of print jobs is denied. Alternatively, the request may be suspended until enough space of the memory is cleared and released.

Figure 6:
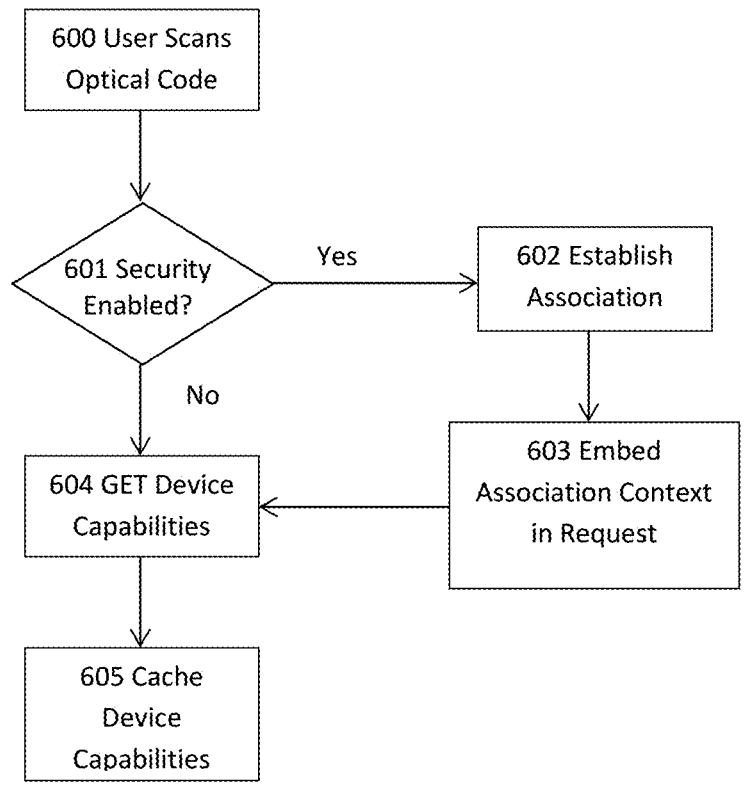
FIG. 6 is a block diagram showing an embodiment for adding an entry of a new data/image process device in a mobile device.

FIG. 2 illustrates a mobile data processing job performed in a security enabled environment. It will be appreciated that, in some situations, the mobile data processing may also be required in a non-security enabled environment. Therefore, in one embodiment, the system for performing the mobile data processing may include a switch allowing the data processing device 20 switched between a security-enabled mode and a security disabled mode. FIG. 6 illustrates a processing allowing the mobile device 20 to add an entry of the image processing device 30 in both secured and unsecured modes. As shown in FIG. 6, to add the image processing device 20 into a list of devices that mobile device 30 can access, an optical code is generated by the image processing device 20 and scanned by the mobile device 30 in Step 600. The optical code provides information identifying whether the image processing device 20 is operating in a secured mode or not. If it is determined that the image processing device 20 is operating in a secured mode in step 601, the association between the image processing device 20 and the mobile device 30 under the secured mode is performed in step 602. The establishment of the association may be performed by the steps as illustrated in blocks 201 to 207 of FIG. 2. Once the association with the image processing device 20 is established, the mobile device 30 embeds the association context in a request, for example, an HTTP request, for obtaining the information relating to capabilities of the imaging processing device 20 in step 603. In step 604, the image processing device 20 transmits capability information to the mobile device 30, and the mobile device 30 creates and caches an entry of the image processing device accompanied with device capability information in step 605.

As discussed above, the image processing device 20 may be switched to operate in a secured mode or an unsecured mode. The switching may be performed by the user or a controller of the system via the server 10 or directly by a switching function built into the image processing device 20. If it is determined that the security is not enabled in step 601, the process flows directly from step 601 to step 604.

Figure 7:
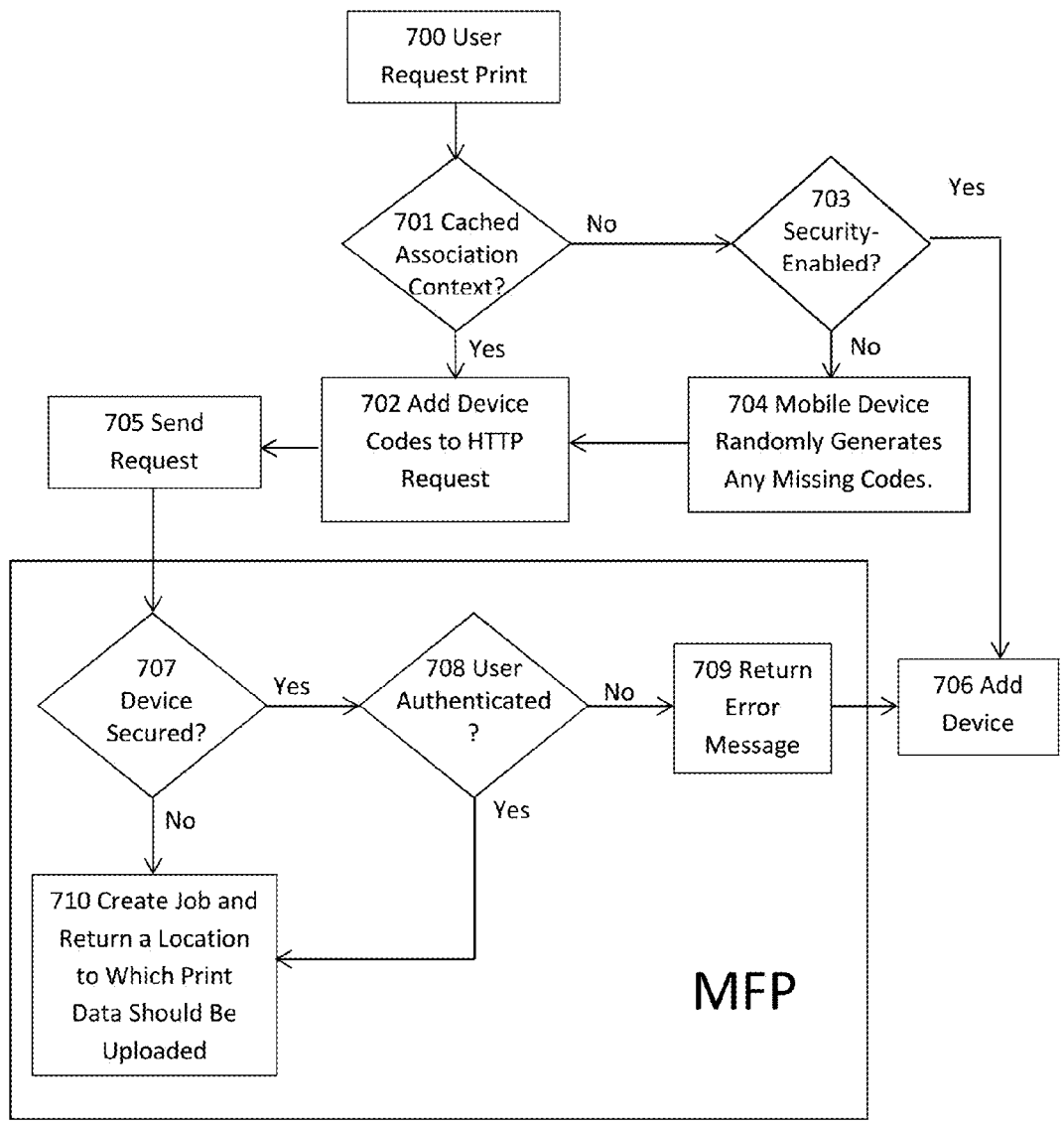
FIG. 7 is a block diagram showing an embodiment of mobile data processing performed.

FIG. 7 is a block diagram showing the mobile data processing performed in a system switchable between a secured mode and an unsecured mode. In step 700, the user starts the operation of a print job request by a mobile device 30. In step 701, the mobile device 30 determines whether the image processing device 20 desired to execute the print job exists in a device list. If an association context has been cached in the mobile device 30, device codes of the image processing device 20 and the mobile device 30 described above are added in request, for example, a HTTP request in step 702, and a request to print is sent to the image processing device 20 in step 705. If the association context between the image processing device 20 and the mobile device 30 has not been cached in the mobile device 40, it is determined whether the image processing device 20 is operating in a security enabled mode in step 703. If the image processing device 20 is switched to operate in a security disabled mode, the mobile device may randomly generate a pair of device codes and transmit them to the image processing device 20 in step 704, followed by the step of sending the print request in step 705. If the image processing device 20 is switched to operate in a security enabled mode, the process flows to step 706, in which steps for establishing an association between the image processing device 20, the mobile device 30, and the user as shown in FIG. 2, are performed to create an entry of the image processing device 20 in the mobile device 30.

Once the print request is sent to the image processing device 20 in step 705, it is determined whether the image processing device is operating in the security enabled mode in step 707. If the security mode is switched on, the user needs to be authenticated. If the user is not authenticated in step 708, an error message is returned to the mobile device 30 in step 709 and the process flows to step 706 for adding a new device. If the user is authenticated in step 708, or if the image processing device 20 is not operating in the secured mode, a confirmation for executing the print job is returned to the mobile device in step 710. The confirmation may include a location to which the print data should be uploaded.

Figure 8:
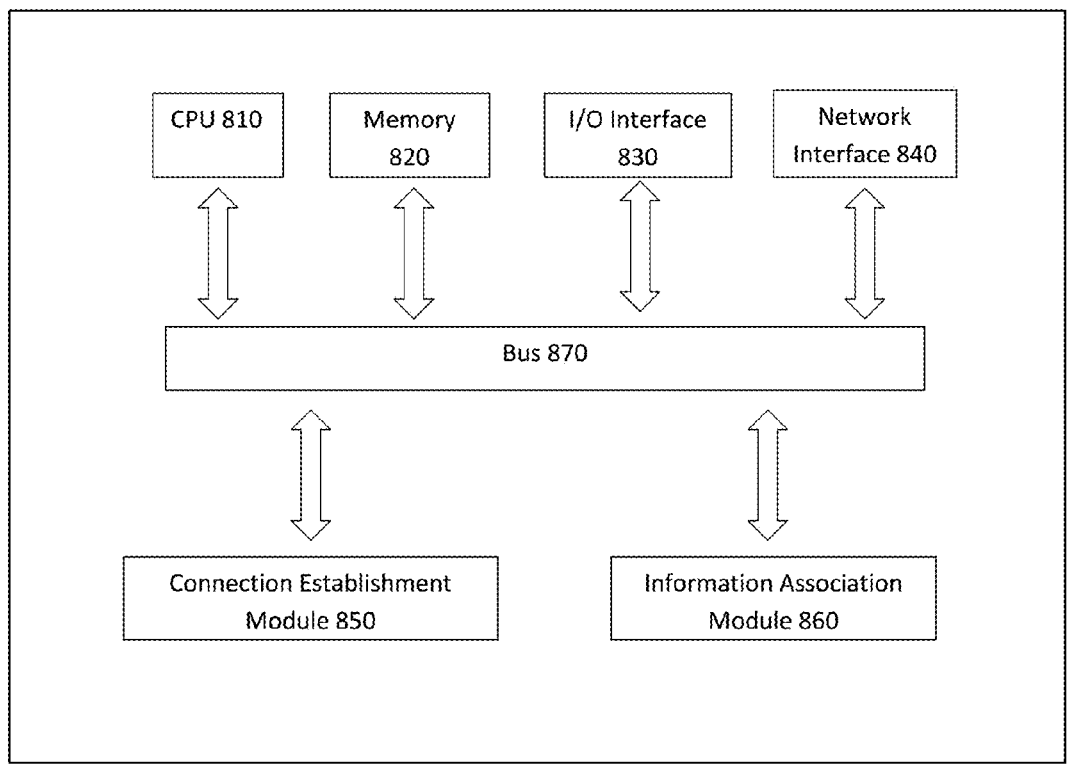
FIG. 8 shows an exemplary block diagram of the data/image processing device.

FIG. 8 is a block diagram that illustrates an example of a data/image processing device, for example, the data/image processing device 20 as shown in FIGS. 1 and 2. The data/image processing device includes at least one processor (CPU) 810, a memory/storage device 820, at least one I/O interface 830, a network interface 840, a connection establishment module 850, an information association module 860, and a bus 870.

The CPU 810 includes one or more central processing units, which includes microprocessors (for example, a single core compressor, a multi-core microprocessor) or other integrated circuits. The CPU 810 is configured to read and perform computer-executable instructions such as instruction stored in storage or in a memory (for example, software in modules that are stored in the storage or memory). The computer-executable instructions may include those for the performance of the operations described herein.

The memory 820 includes one or more computer-readable or computer-writable storage media. A computer-readable storage medium, as opposed to mere transitory, propagating signals, includes a tangible article of manufacture, for example, a magnetic disk (for example, a floppy disk, a hard disk), an optical disc (for example, a CD, a DVD, a Blue-ray), a magneto-optical disk, magnetic tape, or semiconductor memory (for example, a non-volatile memory, flash memory, a solid-state drive, SRAM, DRAM, EPROM, EEPROM).

The memory 820 is configured to store computer-readable data or computer-executable instructions. The memory 820 may also be configured to store entries of the users, the requested data processing jobs, and the information of the mobile devices as discussed above. In an alternate embodiment, the computer readable/writable instructions and the various entries may be stored in different memory or storage units. The I/O interface 830 includes communication interfaces to input and output devices, which may include the display, the card reader, the keyboard, the mouse as discussed above, and/or a light pen, an optical-storage device, a printer, a scanner, a microphone, a camera, and a drive.

The network interface 840 is configured to establish a communication between the data/image processing device with another network devices or another multiple function device. The connection establishment module 850 includes a data structure that includes the computer readable/writable instructions that, when executed, cause the data/image processing device to establish a connection with other device such as the mobile device or other devices.

The information association module 860 is configured to generate a device code in response to authentication of a user. In one embodiment, the information association module 860 encodes the device code in the form of an optically-readable code that can be displayed by the I/O interface 830. The bus 870 is configured to allow the components of the data/image processing device to communicate with each other.

In the embodiment as shown in FIG. 8, the data processing device includes the connection establishment module 850 and the information association module 860 as individual processing units from the CPU 810. It will be appreciated that the connection established module 850 and the information association module 860 can be embedded in the CPU 810 as desired.

Similar to the data processing device, the mobile device may include a CPU, a memory, an I/O interface, a network interface, a connection establishment module, an information association module, and a bus with similar or the same functions as those described in FIG. 8. The illustrations of the same structures are not repeated in another drawing.

The above described devices, systems, and methods can be implemented by supplying one or more computer-readable media having stored therein computer-executable instructions for realizing the above described operations to one or more computer devices that are configured to read the computer-executable instructions and execute them. In this case, the system or devices perform the operations of the above-described embodiments when executing the computer-executable instructions. Also, an operating system on the one or more systems or devices may implement the operations of the above described embodiments. This, the computer-executable instructions or the one or more computer-readable media storing the computer-executable instructions or the one or more computer-readable media storing the computer-executable instructions thereon constitute an embodiment.

Any applicable computer-readable medium, for example, a magnetic disk including a floppy disk and a hard disk, an optical disc including a CD, a DVD, a Blue-ray disc, a magneto-optical disk, a magnetic tape, and a solid state memory such as a flash memory, a DRAM, an SRAM, a solid state drive can be employed as a computer-readable medium for the computer-executable instructions. The computer-executable instructions may be written to a computer-readable medium provided on a function extension board inserted into the device or on a function-extension unit connected to the device, and a CPU provided on the function-extension board or unit may implement the operations of the above-described embodiments.

While the above disclosure describes certain illustrative embodiments, the invention is not limited to the above-described embodiments, and the following claims include various modifications and equivalent arrangements within their scope.

What is claimed is:

1. A mobile data processing method, comprising:
    generating a device code by a data processing device in response to an authentication of a user at the data processing device;
    receiving the device code generated by the data processing device by a mobile device;
    generating a device code of the mobile device associated with the user in response to reception of the device code generated by the data processing device, the device code of the mobile device does not include information of the device code generated by the data processing device;
    requesting the data processing device to perform a data processing job by a user of the mobile device;
    transmitting a device code of the mobile device to the data processing device, the device code being associated with the user of the mobile device;
    creating an entry of the data processing job in association with the user of the mobile device and the device code of the mobile device in the data processing device if the device code of the mobile device is identified by the data processing device;
    authenticating the user of the mobile device by the data processing device; and
    executing the data processing job if the entry of the data processing job is created and stored in association with the user and the device code of the mobile device in the data processing device.

2. The method of claim 1, further comprising associating the data processing device with the mobile device by:
    creating the new entry of the device code of the mobile device in association with the user in the data processing device.

3. The method of claim 2, further comprising generating an optical code encoded with the device code by the data processing device.

4. The method of claim 2, further comprising:
displaying the device code of the data processing device by the data processing device; and
receiving the device code of the data processing device by using the mobile device to capture an image thereof displayed by the mobile device.

5. The method of claim 1, wherein the data processing job includes a print job, a scan job, a facsimile job, or a copy job.

6. The method of claim 1, further comprising the following steps if the data processing job includes a print job:
requesting another print job from the mobile device;
creating an entry of the another print job in association with the user and the mobile device in the data processing device and holding the entry in a memory of the data processing device;
authenticating the user of the mobile device by the data processing device; and
executing the another print job.

7. The method of claim 1, further comprising transmitting data to be printed to the data processing device from the mobile device if the data processing job includes a print job.

8. The method of claim 1, further comprising the following steps if the data processing job includes a scan job:
determining whether the user has logged in to the data processing device;
inputting data to be scanned to the data processing device;
creating an entry of the data to be scanned in association with the user and the mobile device; and
executing the scan job.

9. The method of claim 8, further comprising transmitting the executed scan job to the mobile device.

10. A non-transitory computer-readable storage medium storing a program used by a computer to execute a mobile data processing method, the method comprising:
generating a device code by a data processing device in response to an authentication of a user at the data processing device;
receiving the device code generated by the data processing device by a mobile device;
generating a device code of the mobile device associated with the user in response to reception of the device code generated by the data processing device, the device code of the mobile device does not include information of the device code generated by the data processing device;
requesting a data processing device to perform a data processing job by a user of a mobile device;
transmitting a device code of the mobile device to the data processing device, the device code being associated with the user of the mobile device;
authenticating the user of the mobile device by the data processing device;
determining whether the device code of the mobile device is identifiable by the data processing device;
creating an entry of the data processing job in association with the user and the device code of the mobile device in the data processing device if the device code of the mobile device is identified by the data processing device; and
executing the data processing job if the entry of the data processing job is created and stored in association with the user of the mobile device and the mobile device in the data processing device.

11. The non-transitory computer-readable storage medium according to claim 10, wherein the method further comprises associating the data processing device with the mobile device by:
creating the new entry of the device code of the mobile device in association with the user in the data processing device.

12. A mobile data processing method, comprising:
requesting a data processing job to be performed by a data processing device from a mobile device by a user;
determining whether an association between the data processing device and the mobile device is stored in the mobile device;
transmitting a first device code and a second device code while sending a request to perform the data processing job to the data processing device if:
the association has been stored in the mobile device, wherein the first device code is received from the data processing device and the second device code is generated in association with the user in response to reception of the first device code, and the second device code does not include information of the first device code; or
the data processing job is to be performed in a security disabled mode, wherein the first device code and the second device codes are randomly generated by the mobile device;
determining if the data processing device is operating in a security enabled mode or a security disabled mode;
returning an error message to the mobile device if the data processing device is operating in the security enabled mode and the user has not been authenticated by the data processing device; and
executing the data processing job if:
the data processing device is operating in the security disabled mode; or
the data processing device is operating in the security enabled mode and the user has been authenticated by the data processing device.

13. The method according to claim 12, further comprising generating the first device code by the data processing device in response to authentication of the user for establishing the association.

14. The method according to claim 13, further comprising generating the second device code by the mobile device upon receiving the first device code for establishing the association.

15. A mobile processing apparatus, comprising:
a data processing device, comprising:
a first receiving unit configured to receive a user identification information;
a first information association unit configured to generate a first device code in response to authenticate the user based on the user identification information;
a first network interface unit configured to provide the first device code; and
a mobile device, comprising:
a second receiving unit configured to receive the first device code from the first network interface unit;
a second information association unit configured to generate a second device code in association with the user if the first device code is received by the second receiving unit;
a second network interface unit configured to transmit the first and second device code to the data processing device,
wherein the second information association unit is further configured to generate the second device code and a random third device code if the first device code is not received.

16. The apparatus according to claim 15, wherein:
the first device code is encoded with an optically readable code encoded generated by the first information association unit; and
the data processing device further comprises a display configured to display the optically readable code.

17. The apparatus according to claim 16, wherein the second receiving unit is configured to receive the first device code by capturing an image of the optically readable code.

18. The apparatus according to claim 15, wherein the data processing device further comprises a processing unit for executing a data processing job upon reception of the first and second device codes from the mobile device.

19. The apparatus according to claim 15, wherein the data processing device includes at least one of a printer, a scanner, a copier, and a facsimile.

* * * * *